United States Patent
Park et al.

[11] Patent Number: 5,937,335
[45] Date of Patent: Aug. 10, 1999

[54] TRANSMISSION AND RECEPTION APPARATUS HAVING A SINGLE PHASE-LOCKED LOOP AND METHOD THEREOF

[75] Inventors: Jae-Sun Park, Ahnsan; Sung-Soo Kim, Suwon; Joung-Kyou Park; Hyung-Weon Park, both of Seoul, all of Rep. of Korea

[73] Assignee: SamSung Electronics Co., Ltd., Kyungki-do, Rep. of Korea

[21] Appl. No.: 08/630,825

[22] Filed: Apr. 10, 1996

[30] Foreign Application Priority Data

Apr. 13, 1995 [KR] Rep. of Korea .................. 95-8687

[51] Int. Cl.$^6$ ......................................... H04B 1/40
[52] U.S. Cl. ............................ 455/86; 455/76; 455/112
[58] Field of Search .......................... 455/87, 313, 318, 455/319, 323, 85, 86, 76, 112, 84, 324, 314; 375/219, 344, 326

[56] References Cited

U.S. PATENT DOCUMENTS

| | | |
|---|---|---|
| 3,675,131 | 7/1972 | Pickholtz ................................. 325/329 |
| 4,092,594 | 5/1978 | Baker ....................................... 325/21 |
| 4,246,539 | 1/1981 | Hauki et al. ............................. 455/76 |
| 4,393,626 | 7/1983 | Kurihara et al. ........................ 331/12 |
| 4,476,575 | 10/1984 | Franke et al. ........................... 455/76 |
| 4,682,117 | 7/1987 | Gibson ..................................... 329/50 |
| 4,953,182 | 8/1990 | Chung ...................................... 375/97 |
| 5,023,930 | 6/1991 | Leslie ........................................ 455/9 |
| 5,077,731 | 12/1991 | Omiya ...................................... 370/30 |
| 5,095,533 | 3/1992 | Loper et al. ............................ 455/245 |
| 5,230,088 | 7/1993 | Kramer, Jr. et al. ..................... 455/76 |
| 5,301,367 | 4/1994 | Heinonen ................................. 455/76 |
| 5,307,378 | 4/1994 | Norimatsu ................................ 375/39 |
| 5,323,425 | 6/1994 | Colamonico et al. ..................... 375/98 |
| 5,392,460 | 2/1995 | Mattila et al. ............................ 455/76 |
| 5,432,779 | 7/1995 | Shimo et al. ............................. 370/30 |
| 5,485,489 | 1/1996 | Chiba ...................................... 375/344 |
| 5,689,819 | 11/1997 | Nishimura et al. ....................... 455/86 |

FOREIGN PATENT DOCUMENTS 3-66233  3/1991  Japan .

OTHER PUBLICATIONS

T.D. Forrester, Synthesized f.m. transceiver–1, Wireless World, figure 2, Nov. 1997.

*Primary Examiner*—Reinhard J. Eisenzopf
*Assistant Examiner*—Darnell R. Armstrong
*Attorney, Agent, or Firm*—Robert E. Bushnell, Esq.

[57] ABSTRACT

A transmission and reception method and apparatus is capable of supplying local oscillation frequencies for upconversion and downconversion, as well as carrier frequencies for modulation and demodulation by utilizing only one local oscillator. The apparatus includes a reference signal generator for generating a reference signal, and a phase locked loop for locking the output of the reference signal generator to a predetermined frequency. A signal generator generates a signal in response to the output provided from the phase locked loop, and provides the signal to phase shifters in modulation and demodulation circuits. A first frequency multiplier multiplies the output of the signal generator, a first band pass filter band pass filters the output of the first frequency multiplier, and a first amplifier amplifies the output of the first band pass filter and provides the amplified result to an upconversion mixer. A second frequency multiplier multiplies the output of the signal generator, a second band pass filter band pass filters the output of the second frequency multiplier, and a second amplifier amplifies the output of the second band pass filter and provides the amplified result to a downconversion mixer.

14 Claims, 3 Drawing Sheets

TRANSMISSION AND RECEPTION APPARATUS HAVING A SINGLE PHASE-LOCKED LOOP AND METHOD THEREOF

CROSS-REFERENCE TO RELATED APPLICATIONS

This application makes reference to, incorporates the same herein, and claims all benefits accruing under 35 U.S.C. §119 from an application for *Transmission And Reception Apparatus Having A Single Phase-Locked Loop And Method Thereof* earlier filed in the Korean Industrial Property Office on Apr. 13, 1995 and there assigned Ser. No. 8687/1995.

BACKGROUND OF THE INVENTION

The present invention relates to a transmission and reception apparatus and method for use in a radio communication system, and more particularly to a transmission and reception apparatus and method having only one phase-locked loop circuit, which is capable of providing local oscillation frequencies for upconversion and downconversion, as well as carrier frequencies for modulation and demodulation by utilizing only one phase-locked loop circuit.

U.S. Pat. No. 4,212,013 issued to Biethan on Jun. 8, 1980 discloses a general duplex-transmitter-receiver arrangement wherein only one oscillator is utilized for the transmitter and receiver, resulting in a considerable simplification of technical problems and a reduction in financial outlay. We have found that in the practice of this circuit a separate oscillator should be utilized for a transmission demodulator and a reception filter, respectively; consequently, the circuit for implementing a transceiver will be relatively complex, and concomitantly expensive in its construction.

U.S. Pat. No. 5,036,327 issued to Dannenberg on Jun. 30, 1991 discloses a radar receiver and transmitter using a single oscillator frequency shift keyed system. In Dannenburg '327, the oscillator shifts between a pulsed output frequency and a local frequency such that the system can transmit at one frequency and shift fast enough so that when an echo pulse is received, the transmitter is operating at the local frequency desired. While this type of conventional art provides advantages in its own right, we believe that an improved configuration can be contemplated.

SUMMARY OF THE INVENTION

Therefore, it is an object of the present invention to provide an improved transmission and reception apparatus and method for a radio frequency communication system.

It is another object to provide a transmission and reception apparatus and method capable of providing local oscillation frequencies for upconversion and downconversion, as well as carrier frequencies for modulation and demodulation by utilizing only one phase-locked loop circuit.

It is still another object to provide a transmission and reception apparatus and method that can be embodied for a relatively low cost.

It is yet another object to provide a transmission and reception apparatus and method that reduces the number of frequency sources that are used.

It is still yet another object to provide a transmission and reception apparatus and method that can be embodied in a miniaturized radio communication system.

To achieve these and other objects, the present invention provides a transmission and reception method characterized in that a frequency is used as a first local oscillation frequency for an upconversion in a transmission mode by multiplying the frequency by a first predetermined integer value, and is used as a second local oscillation frequency for a downconversion in a reception mode by multiplying the frequency by a second predetermined integer value. The frequency is also used as a frequency for quadrature modulation and quadrature demodulation.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
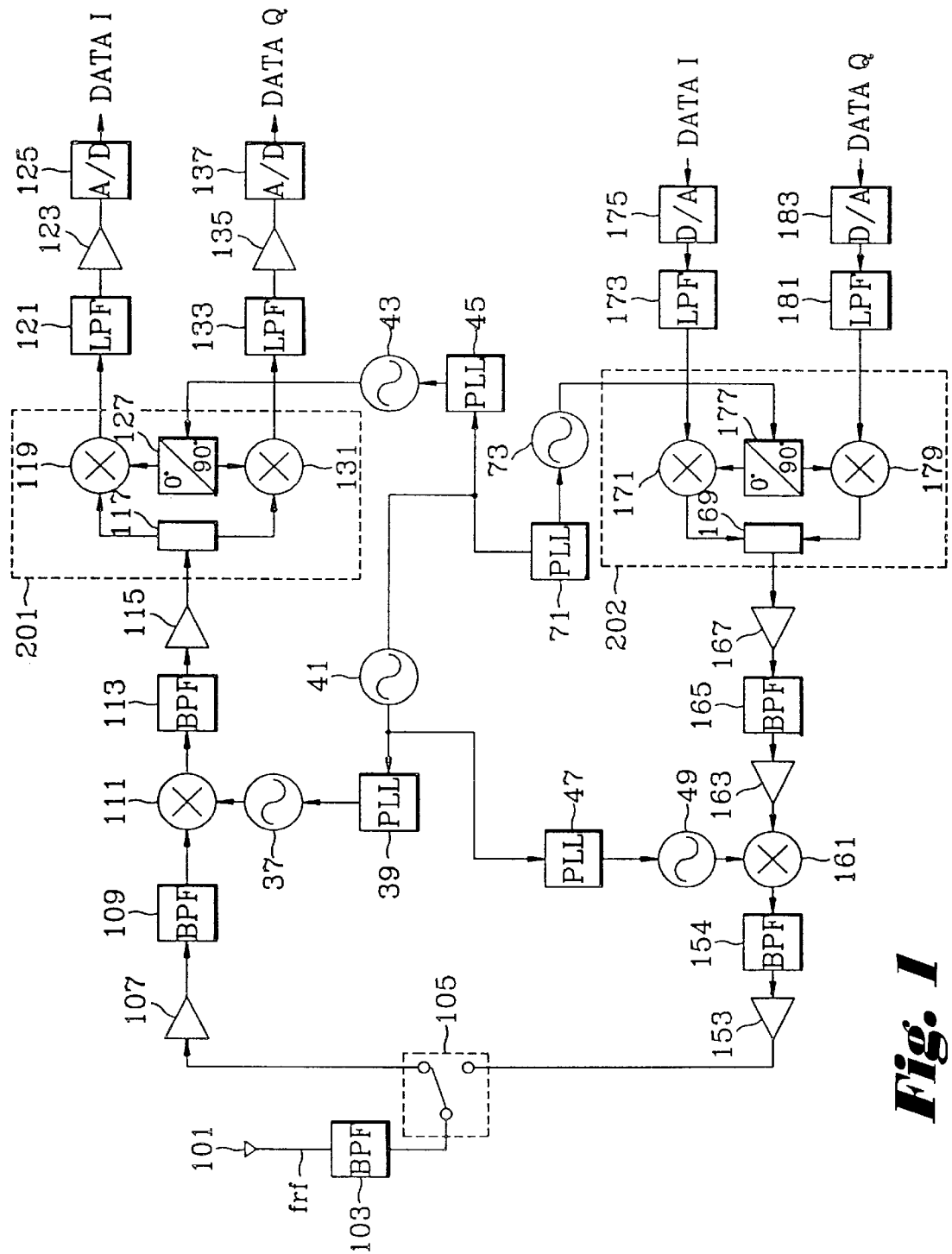
FIG. 1 is a diagram illustrating a general radio communication system.

Turning now to the drawings and referring to FIG. 1, a general radio communication system is shown. In FIG. 1, transmission data I and Q are respectively converted into analog signals via digital-to-analog converters (hereinafter referred to as an "D/A converter") 175 and 183. The analog signals are then passed through low pass filters (hereinafter referred to as an "LPF") 173 and 181 for removal of the higher frequency components. The outputs of low pass filters 173 and 181 are respectively input to quadrature mixers 171 and 179 within a quadrature-modulation circuit 202. During this time, mixers 171 and 179 receive signals having a 0° phase and a 90° phase, respectively, which are generated by dividing a signal into 0° and 90° phases at a phase shifter 177. The signal being divided is generated from a signal generator 73 that is phase-locked with a reference signal generated from a reference signal generator 41 through a phase locked loop (hereinafter referred to as a "PLL") 71. In other words, the signal generated from signal generator 73 is divided into two distinct signals both having the same frequency, but one signal has a phase that is shifted by 90° with respect to the other signal. Accordingly, mixers 171 and 179 mix the outputs of LPFs 173 and 181 with the outputs of phase shifter 177. The outputs of mixers 171 and 179 are then combined in a combiner 169, and output as a quadrature-modulated signal. The quadrature-modulated signal is amplified through an amplifier 167, and then passed through a band pass filter (hereinafter referred to as a "BPF") 165. Accordingly, only a selected frequency band of the quadrature-modulated signal is passed. The filtered signal output from BPF 165 is amplified again to a predetermined level by an amplifier 163, and then is transmitted to an upconversion mixer 161. Mixer 161 receives an output from a signal generator 49 which is phase-locked with the reference signal output from reference signal generator 41 through a PLL 47, thereby upconverting the output of amplifier 163. The upconverted signal is transmitted to a power amplifier 153 through a BPF 154. The signal output from power amplifier 153 is transmitted through an antenna 101 via a switch 105 and a BPF 103.

During a receiving operation, a reception signal provided from antenna 101 is transmitted to a low noise amplifier 107 through BPF 103 and switch 105. Low noise amplifier 107 amplifies the relatively weak reception signal to 10–30 dB. A BPF 109 extracts only a necessary reception band from the amplified signal, and then provides output to a downconversion mixer 111. Mixer 111 also receives an output from a signal generator 37 which is phase-locked with the reference signal generated from reference signal generator 41 through a PLL 39. Accordingly, mixer 111 outputs a signal $Nf1 \pm Mf2$ (where N and M are integers). The signal output from mixer 111 is applied to a BPF 113, and only the frequency band f1–f2 is passed. Thus, the reception signal frequency f1 is lowered by a local oscillation frequency f2, to generate an intermediate frequency of f1–f2. The intermediate frequency is amplified again through an amplifier 115, and is then applied to a distributor 117 within a quadrature-demodulation circuit 201. Distributor 117 distributes and provides the amplified signal to demodulation mixers 119 and 131. During this time, mixers 119 and 131 receive signals having a 0° phase and a 90° phase, respectively, which are generated by dividing a signal into 0° and 90° phases at a phase shifter 127. The signal being divided is generated from a signal generator 43 that is phase-locked with the reference signal generated from reference signal generator 41 through a PLL 45. Output signals from mixers 119 and 131 are respectively passed through LPFs 121 and 133 for removal of high frequency noise. The outputs of LPFs 121 and 133 are respectively amplified via amplifiers 123 and 135, and are then transmitted to analog-to-digital converters (hereinafter referred to an "A/D converter") 125 and 137. Accordingly, digitalized signals I and Q are generated. As described above, since this technique employs a plurality of frequency sources, such as a reference signal generator, signal generators and PLLs, system miniaturation and cost reduction can not be readily achieved.

Figure 2:
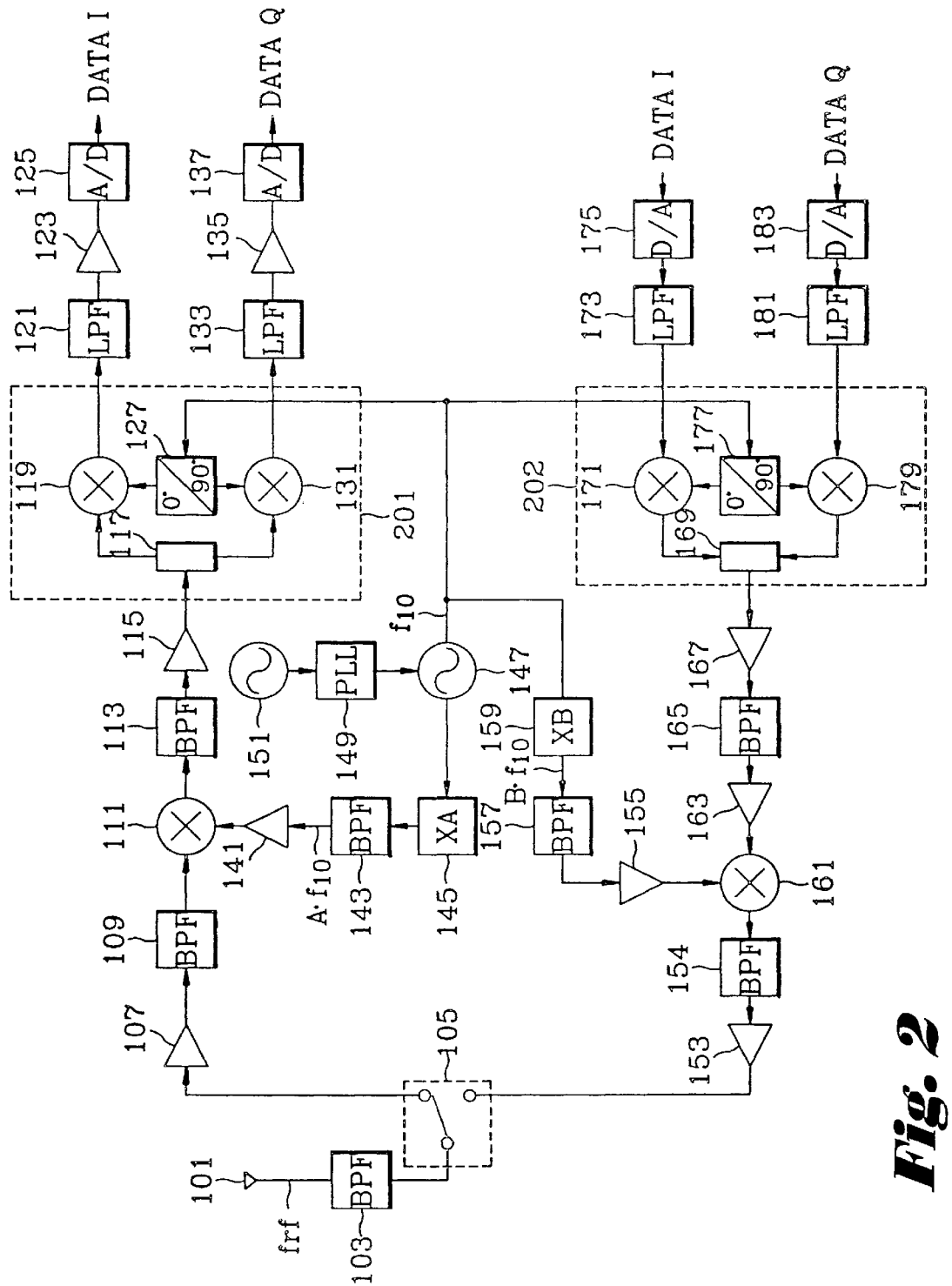
FIG. 2 is a diagram illustrating a radio communication system constructed according to a first embodiment of the present invention.

Referring now to FIG. 2, a circuit for use in a radio communication system having a mixer for upconversion, a mixer for downconversion, a modulation circuit including a combiner, mixers and a phase shifter and a demodulation circuit including a distributor, mixers and a phase shifter is shown. The circuit of FIG. 2 comprises a reference signal generator for generating a reference signal for the radio communication system, a PLL for locking the output of the reference signal generator to a predetermined frequency, a signal generator for generating a signal in response to the output of the PLL and providing the signal to the phase shifters in the modulation and demodulation circuits, a first frequency multiplier for multiplying the output of the signal generator by a first value, a first band pass filter for band pass filtering the output of the first frequency multiplier, a first amplifier for amplifying and supplying the output of the first band pass filter to the mixer for downconversion, a second frequency multiplier for multiplying the output of the signal generator by a second value, a second band pass filter for band pass filtering the output of the second frequency multiplier, and a second amplifier for amplifying and supplying the output of the second band pass filter to the mixer for upconversion.

The first embodiment of the present invention will now be described in detail with reference to FIG. 2. Transmission data I and Q are respectively passed through LPFs 173 and 181 via D/A converters 175 and 183. As a result, the high frequency components are removed from the transmission data I and Q. Outputs from LPFs 173 and 181 are respectively provided to mixers 171 and 179 within a quadrature-modulation circuit 202. During this time, mixers 171 and 179 receive signals having a 0° phase and a 90° phase, respectively, which are generated by dividing a signal into 0° and 90° phases at a phase shifter 177. The signal being divided is generated from a signal generator 147 which is phase-locked with a reference signal generator 151 through a PLL 149. In other words, the signal generated from signal generator 147 is divided into two distinct signals both having the same frequency, but one signal has a phase that is shifted by 90° with respect to the other signal. The signals output from mixers 171 and 179 are combined in a combiner 169, and then output as a quadrature-modulated signal. The quadrature-modulated signal is amplified through an amplifier 167, and is band pass filtered through a BPF 165. The signal output from BPF 165 is amplified again, and then transmitted to an upconversion mixer 161. The signal output from signal generator 147, which is phase-locked with reference signal generator 151 through PLL 149, is frequency-multiplied by an integer value B at a frequency multiplier 159. A BPF 157 filters the signal $B*f_{10}$, and provides output for amplification via an amplifier 155. The signal output from amplifier 155 is transmitted to mixer 161. Accordingly, the signal quadrature-modulated by the frequency $f_{10}$ is upconverted by the frequency $B*f_{10}$. The signal $B*f_{10}+f_{10}$ output from mixer 161 is then filtered through a BPF 154, and thus the output frequency of BPF 154 becomes $(B+1)*f_{10}$. The output of BPF 154 is amplified through a power amplifier 153, and then transmitted through an antenna 101 via a switch 105 and a BPF 103.

During a receiving operation, a reception signal is applied from antenna 101 to a low noise amplifier 107 through BPF 103 and switch 105. The amplified signal output from low noise amplifier 107 is transmitted to a downconversion mixer 111 through a BPF 109. The output signal from signal generator 147, which is phase-locked with reference signal generator 151 through PLL 149, is frequency-multiplied by an integer value A in a frequency multiplier 145. A BPF 143 filters the signal $A*f_{10}$, and provides output for amplification by an amplifier 141. The signal output from amplifier 141 is then transmitted as a local oscillation frequency to mixer 111. Only the difference frequency $frf-A*f_{10}$ between a received frequency frf and the local oscillation frequency is filtered through BPF 113. The signal output from BPF 113 is amplified through an amplifier 115, and is then transmitted to a distributor 117 within a quadrature-demodulation circuit 201. Distributor 117 distributes and applies the amplified signal to mixers 119 and 131. The frequency $f_{10}$ is applied to a phase shifter 127, and signals having a 0° phase and a 90° phase are respectively applied to mixers 119 and 131. The signal demodulated in demodulation circuit 201 is applied to LPFs 121 and 133 for removal of the high frequency components. The signals output from LPFs 121 and 133 are respectively amplified via an amplifier 135, and are then output as data I and Q through A/D converters 125 and 137.

Figure 3:
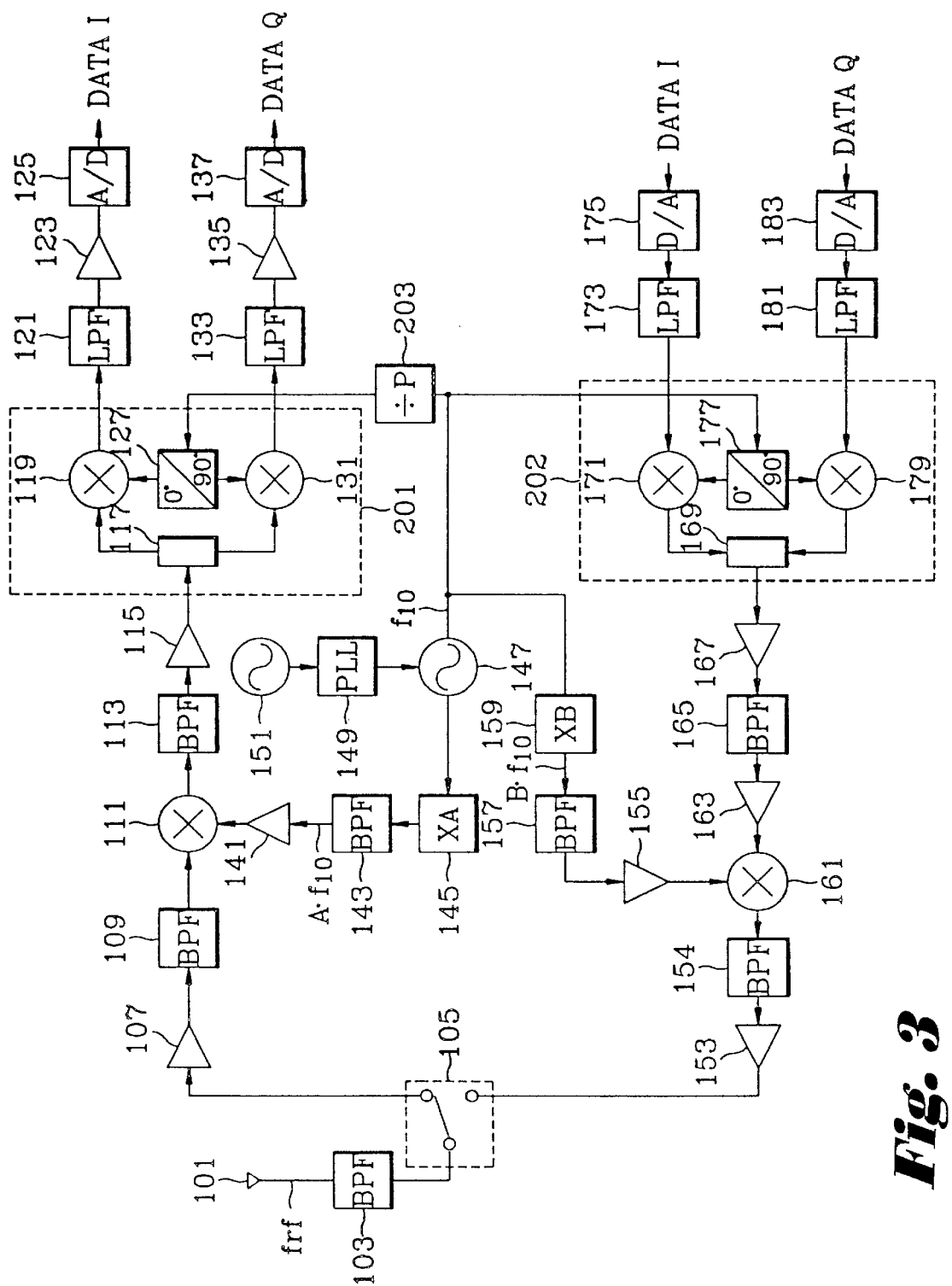
FIG. 3 is a diagram illustrating a radio communication system constructed according to a second embodiment of the present invention.

Referring now to FIG. 3, a diagram illustrating a radio communication system constructed according to a second embodiment of the present invention is shown. FIG. 3 has the same construction as FIG. 2, except that a frequency divider 203 for dividing the frequency of the signal output from signal generator 147 is further provided in this second embodiment. That is, the signal output from signal generator 147 is applied to phase shifter 127 after being frequency divided via frequency divider 203. The values of the frequency $f_{10}$ for the transmitting and receiving operations are different from each other. That is, the modulating frequency $f_{10}$ used for the transmitting operation is expressed as follows:

$B * f_{10} + f_{10} = frf$ (where frf is the transmission frequency)

$f_{10} = frf/(B+1)$, and the demodulating frequency used for the receiving operation is expressed as follows:

$frf - A * f_{10} = f_{10}/P$ (where frf is the reception frequency)

$frf = f_{10}/P + A * f_{10}$ $frf = f_{10}(K + 1/P)$ $f_{10} = (P/(P*K+1)) * frf$.

For the transmitting operation, assuming that frf=2.5GHz and B=4, the modulating frequency $f_{10}$ =500 MHz. For the receiving operation, assuming that frf=2.5GHz, P=4, K=5 and A=5, the frequency $f_{10}$ is about 476 MHz and the demodulating frequency $f_{10}/P$ is about 119 MHz. As described above, the present invention is capable of reducing electrical interference within the circuit by eliminating interference attributable to the use of different frequencies. Moreover, the circuits shown in FIGS. 2 and 3 can be easily constructed at a reduced cost.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A transmission and reception apparatus for use in a radio communication system having an upconversion mixer, a downconversion mixer, a modulation circuit including a distributor, first mixers and a first phase shifter and a demodulation circuit including a combiner, second mixers and a second phase shifter, said apparatus comprising:

a reference signal generator for generating a reference signal for said radio communication system;

a phase locked loop for locking said reference signal to a predetermined frequency;

a signal generator for generating a signal in response to an output provided from said phase locked loop, and supplying said signal to said first and second phase shifters in said modulation and demodulation circuits;

a first frequency multiplier for multiplying said signal by a first predetermined value to generate a first multiplied signal;

a first band pass filter for band pass filtering said first multiplied signal to generate a first filtered signal;

a first amplifier for amplifying said first filtered signal to generate a first amplified signal, and providing said first amplified signal to said upconversion mixer;

a second frequency multiplier for multiplying said signal by a second predetermined value to generate a second multiplied signal;

a second band pass filter for band pass filtering said second multiplied signal to generate a second filtered signal; and a second amplifier for amplifying said second filtered signal to generate a second amplified signal, and providing said second amplified signal to said downconversion mixer.

2. The apparatus as claimed in claim 1, further comprising means for frequency dividing said signal output from said signal generator to generate a frequency divided signal, and providing said frequency divided signal to said second phase shifter in said demodulation circuit.

3. A transmission and reception apparatus for use in a radio communication system, said apparatus comprising:

a modulation circuit having a first phase shifter for performing a signal modulating operation;

a demodulation circuit having a second phase shifter for performing a signal demodulation operation;

a reference signal generator for generating a reference signal for said radio communication system;

a phase locked loop for locking said reference signal to a predetermined frequency;

a signal generator for generating a signal in response to an output provided from said phase locked loop, and providing said signal to said first and second phase shifters in said modulation and demodulation circuits;

a first frequency multiplier for multiplying said signal by a first predetermined value to generate a first multiplied signal;

a first band pass filter for band pass filtering said first multiplied signal to generate a first filtered signal;

a first amplifier for amplifying said first filtered signal to generate a first amplified signal, and providing said first amplified signal to an upconversion mixer;

a second frequency multiplier for multiplying said signal by a second predetermined value to generate a second multiplied signal;

a second band pass filter for band pass filtering said second multiplied signal to generate a second filtered signal; and a second amplifier for amplifying said second filtered signal to generate a second amplified signal, and providing said second amplified signal to a downconversion mixer.

4. The apparatus as claimed in claim 3, wherein said modulation circuit further comprises:

a first mixer for mixing a first data signal with a first phase shifted signal generated from said first phase shifter;

a second mixer for mixing a second data signal with a second phase shifted signal generated from said first phase shifter; and combining means for combining outputs generated from said first and second mixers.

5. The apparatus as claimed in claim 4, wherein said first phase shifted signal is 90° out of phase with respect to said second phase shifted signal.

6. The apparatus as claimed in claim 3, wherein said demodulation circuit further comprises:

distributing means for separating a downconverted signal into first and second data signals;

a first mixer for mixing said first data signal with a first phase shifted signal generated from said second phase shifter; and a second mixer for mixing said second data signal with a second phase shifted signal generated from said second phase shifter.

7. The apparatus as claimed in claim 6, wherein said first phase shifted signal is 90° out of phase with respect to said second phase shifted signal.

8. The apparatus as claimed in claim 3, further comprising means for frequency dividing said signal provided from said signal generator to generate a frequency divided signal, and providing said frequency divided signal to said second phase shifter in said demodulation circuit.

9. A transmission and reception method for a radio communication system, comprising the steps of:

generating a reference signal for said radio communication system;

generating a phase locked signal by phase locking said reference signal to a predetermined frequency;

generating a signal in dependence upon said phase locked signal, and providing said signal to phase shifters in modulation and demodulation circuits;

multiplying said signal by a first predetermined value to generate a first multiplied signal;

band pass filtering said first multiplied signal to generate a first filtered signal;

amplifying said first filtered signal to generate a first amplified signal, and providing said first amplified signal to an upconversion mixer to enable signal transmission;

multiplying said signal by a second predetermined value to generate a second multiplied signal;

band pass filtering said second multiplied signal to generate a second filtered signal; and amplifying said second filtered signal to generate a second amplified signal, and providing said second amplified signal to a downconversion mixer to enable signal reception.

10. The method as claimed in claim 9, further comprising steps of:

phase shifting said signal in said modulation circuit to generate first and second phase shifted signals;

mixing said first phase shifted signal with a first data signal to generate a first mixed signal;

mixing said second phase shifted signal with a second data signal to generate a second mixed signal; and combining said first and second mixed signals.

11. The method as claimed in claim 10, wherein said first phase shifted signal is 90° out of phase with respect to said second phase shifted signal.

12. The method as claimed in claim 9, further comprising steps of:

phase shifting said signal in said demodulation circuit to generate first and second phase shifted signals;

separating a downconverted signal into first and second data signals;

mixing said first data signal with said first phase shifted signal; and mixing said second data signal with said second phase shifted signal.

13. The method as claimed in claim 12, wherein said first phase shifted signal comprises said signal having a 0° phase, and said second phase shifted signal comprises said signal having a 90° phase.

14. The method as claimed in claim 9, further comprising steps of:

frequency dividing said signal to generate a frequency divided signal; and providing said frequency divided signal to said phase shifter in said demodulation circuit.

* * * * *